(12) United States Patent
Oh

(10) Patent No.: US 9,719,456 B2
(45) Date of Patent: Aug. 1, 2017

(54) METHOD FOR CONTROLLING ENGINE IN VARIOUS OPERATING MODES

(71) Applicants: Hyundai Motor Company, Seoul (KR); KIA Motors Corp., Seoul (KR)

(72) Inventor: Young Kyu Oh, Gwacheon-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 0 days.

(21) Appl. No.: 14/930,117

(22) Filed: Nov. 2, 2015

(65) Prior Publication Data

US 2017/0002754 A1    Jan. 5, 2017

(30) Foreign Application Priority Data

Jul. 2, 2015 (KR) .................. 10-2015-0094494

(51) Int. Cl.
| | |
|---|---|
| *F02D 41/30* | (2006.01) |
| *F02M 69/04* | (2006.01) |
| *F02D 1/16* | (2006.01) |
| *F02D 41/40* | (2006.01) |
| *F02D 41/00* | (2006.01) |
| *F02D 41/38* | (2006.01) |

(52) U.S. Cl.
CPC .......... *F02D 41/3094* (2013.01); *F02D 1/16* (2013.01); *F02D 41/401* (2013.01); *F02M 69/046* (2013.01); *F02D 2041/001* (2013.01); *F02D 2041/389* (2013.01)

(58) Field of Classification Search
CPC .......................... F02D 41/3094; F02M 69/046

USPC ................ 123/431, 432, 308, 299, 300, 304
See application file for complete search history.

(56) References Cited

U.S. PATENT DOCUMENTS

| | | | |
|---|---|---|---|
| 6,973,910 B2* | 12/2005 | Ohtani ................ | F02D 41/1498 123/295 |
| 7,347,181 B2* | 3/2008 | Yamashita ............ | F02B 17/005 123/295 |
| 7,770,560 B2* | 8/2010 | Ulrey ....................... | F02D 41/20 123/431 |
| 2005/0098155 A1* | 5/2005 | Yamazaki ........... | F02D 41/3836 123/431 |
| 2005/0193981 A1* | 9/2005 | Sakai ................... | F02D 41/3094 123/431 |
| 2006/0174856 A1* | 8/2006 | Watanabe ............. | F02D 41/086 123/431 |
| 2007/0000478 A1* | 1/2007 | Sadakane ................ | F02D 41/38 123/431 |
| 2014/0250869 A1* | 9/2014 | Kawabe ................ | F02D 41/401 60/285 |

(Continued)

FOREIGN PATENT DOCUMENTS

| | | |
|---|---|---|
| JP | 05-280445 | 10/1993 |
| JP | 2011-144727 | 7/2011 |

(Continued)

*Primary Examiner* — Mahmoud Gimie
(74) *Attorney, Agent, or Firm* — Brinks Gilson & Lione

(57) ABSTRACT

A method for controlling an engine in various operating modes and for controlling an engine having dual injectors, may include selecting a number of injectors configured to inject fuel based on an operating mode of the various operating modes, and injecting fuel based on a selection of whether to inject fuel while an intake valve is open, or to inject fuel while the intake valve is closed.

13 Claims, 4 Drawing Sheets

(56) References Cited

U.S. PATENT DOCUMENTS

2015/0285166 A1* 10/2015 Surnilla ............... F02D 33/003
123/294

FOREIGN PATENT DOCUMENTS

| | | |
|---|---|---|
| JP | 2013-015023 | 1/2013 |
| JP | 2015-021482 | 2/2015 |
| KR | 10-1997-0070526 | 11/1997 |

* cited by examiner

METHOD FOR CONTROLLING ENGINE IN VARIOUS OPERATING MODES

CROSS-REFERENCE TO RELATED APPLICATION

This application claims priority to Korean Patent Application No. 10-2015-0094494, filed Jul. 2, 2015 in the Korean Intellectual Property Office, the entire contents of which is incorporated herein by reference.

FIELD

The present disclosure relates to technology for controlling injection of fuel by controlling injectors of an engine, and more particularly to a method for controlling an engine in various operating modes. The disclosure is further concerned with a method for controlling a dual-injector engine in which two injectors are provided in a same combustion chamber of the engine to supply the fuel, the method distributing an amount of fuel to be injected from the two injectors based on an operating mode of the various operating modes.

BACKGROUND

Unlike in related art in which vehicles are used for business purposes or in which driving is considered a necessity, driving for enjoyment has now become accessible to amateurs, and more and more people wish to use a single vehicle to enjoy driving in different modes. In addition, due to high oil prices and increasingly stringent regulations regarding CO2 and exhaust gases, the development of vehicles having enhanced fuel efficiency and eco-friendly characteristics has become a critical issue.

Conventionally, in the case of natural aspiration Multi-Point Injection (MPI), a single injector is provided in a single combustion chamber, and in order to supply a sufficient amount of fuel in a sufficiently vaporized state to the corresponding combustion chamber, it is necessary to inject fuel via the injector even during time periods other than while an intake valve is open.

However, injection of fuel while the intake valve is not open, as described above, causes problems such as, for example, the wall wetting phenomenon of fuel wetting the wall surface of an intake port, which consequently has a negative effect on the fuel efficiency of the vehicle and the emission of harmful exhaust substances.

Meanwhile, a dual-injector engine is configured in such a way that two injectors are provided in a single combustion chamber and controlled to supply an appropriate amount of fuel to the combustion chamber, in the interests of increasing volumetric efficiency in order to increase fuel efficiency and reduce the emission of harmful exhaust substances.

In the dual-injector engine as described above, the injectors need to be mounted as close as possible to the position at which the intake valve opens, in order to reduce the wall wetting phenomenon. In addition, in order to achieve a homogeneous fuel/air mixture, and reduce the temperature thereof, the injectors need to inject fuel while the intake valve is open. In addition, the injectors require low penetrability in order to reduce the well wetting phenomenon.

Hence, coordinated control of the injectors may determine, for example, the vaporization of fuel supplied to the combustion chamber, and the vaporization of fuel has a considerably great effect on the combustion of the engine, and ultimately has great capacity to change the fuel efficiency of the vehicle and the generation of harmful exhaust substances.

Therefore, there is a need to provide a method for controlling an engine in various operating modes, where the method defines various operating modes based on the user's taste and controls the amount of fuel corresponding to each mode, thereby enhancing fuel efficiency and satisfying environmental regulations by reducing the emission of harmful exhaust substances.

The matters disclosed in this section are merely for enhancement of understanding of the general background of the disclosure and should not be taken as an acknowledgment or any form of suggestion that the matters disclosed are already known to a person skilled in the art.

SUMMARY

The present disclosure provides a method for controlling an engine having dual injectors and various operating modes, the method including a step of selecting a number of injectors configured for injecting fuel based on an operating mode of the various operating modes, and a step of injecting fuel based on the selection of whether to inject fuel while an intake valve is open, or to inject fuel while the intake valve is closed.

The operating modes may be divided into a general mode, a first mode aimed at fuel efficiency improvement, and a second mode aimed at performance increase.

In the general mode, a controller may be configured to control adjustment of an amount of fuel to be introduced into a combustion chamber by adjusting an injection ratio, injection amount, and injection timing of the injectors in a previously input way.

The first mode may perform injection with only one injector.

The second mode may perform injection with both of the injectors.

The fuel injecting step may include adjusting injection timings of a main injector and an auxiliary injector such that fuel is injected within a prescribed set interval between bottom dead center (BDC) and top dead center (TDC).

In the fuel injecting step, an injector may be controlled, when an effective injection period of the main injector is set to extend from before BDC to after BDC, such that the effective injection period is shifted into the set interval.

In the fuel injecting step, an injector may be controlled, when an effective injection period of the main injector is set to occur after TDC, such that the effective injection period is shifted into the set interval.

In the fuel injecting step, an injector may be controlled, when an effective injection period of the main injector is set to extend from before TDC to after TDC, such that the effective injection period is shifted into the set interval.

In the fuel injecting step, the main injector and the auxiliary injector may be controlled to inject fuel such that, when an effective injection period of the main injector is set to extend from a time after BDC to a time after TDC and to be longer than the set interval, the effective injection period of the main injector is shifted into the set interval.

In the fuel injecting step, the injectors may be controlled such that the main injector injects fuel during the entire set interval, and the auxiliary injector injects fuel simultaneously with the main injector from a late injection period of the main injector and during an additional effective injection period of the main injector that falls outside of the set interval.

In the fuel injecting step, the injectors may be controlled such that the auxiliary injector injects fuel from a latter half of the set interval, and the main injector injects fuel after the injection of fuel through the auxiliary injector.

In the fuel injecting step, the injectors may be controlled such that the main injector injects fuel during the entire set interval, the auxiliary injector injects fuel during a period calculated by subtracting from the set interval an additional effective injection period of the main injector that falls outside of the set interval, and the main injector additionally injects fuel during the subtracted period.

DRAWINGS

The above and other objects, features and other advantages of the present disclosure will be more clearly understood from the following detailed description taken in conjunction with the accompanying drawings, in which.

DETAILED DESCRIPTION

Figure 1:
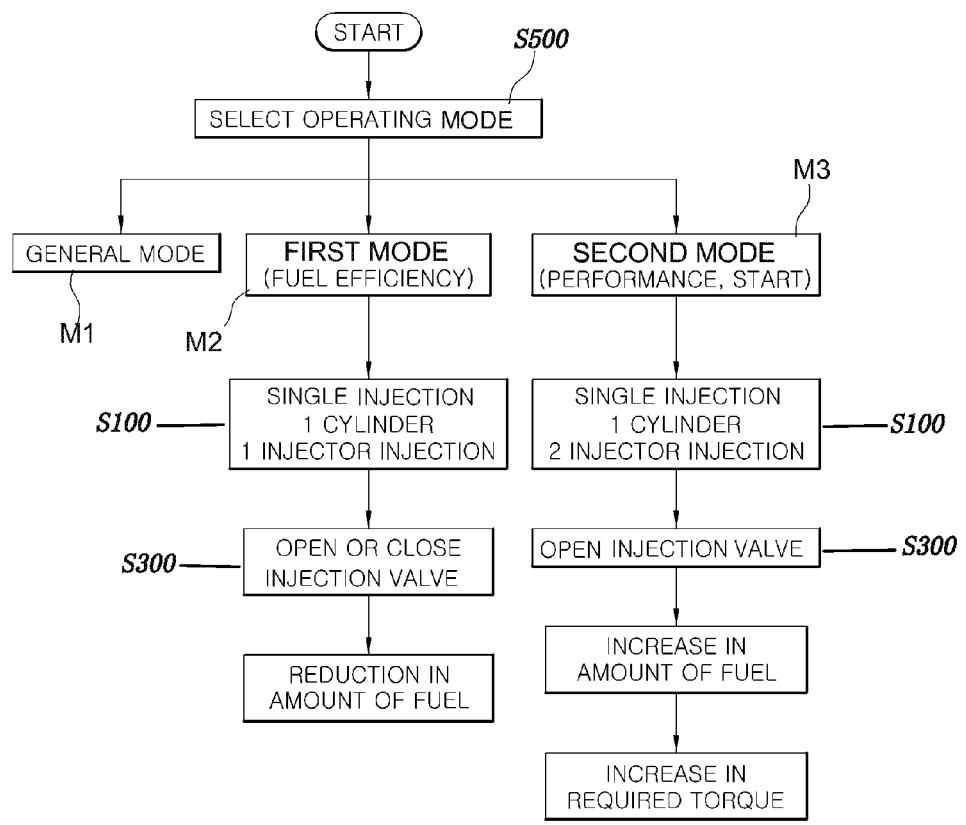
FIG. 1 is a flowchart of a method for controlling an engine in various operating modes.

Reference will now be made in detail to a method for controlling an engine in various operating modes according to an exemplary form of the present disclosure, examples of which are illustrated in the accompanying drawings. Wherever possible, the same reference numbers will be used throughout the drawings to refer to the same or like parts.

As described above with regard to the related art, dual injectors are used to implement various operating modes in a single vehicle, and, for example, the number of injectors, asymmetric/symmetric flow-rate application, injection ratio, injection amount, and injection timing may be precisely regulated to increase the user's satisfaction and fuel efficiency and to comply with environmental regulations.

To maximize fuel efficiency or power performance, it is important to reduce mechanical braking in deceleration situations, to minimize the consumption of fuel via inertial driving in a reduced fuel situation (single cylinder and single injection operation), and to avoid rapid acceleration (two cylinders+open valve injection) in acceleration situations. In addition, constant-speed driving, when requested by the driver, is implemented to increase fuel efficiency, and a vehicle is accelerated in a specific way for dynamic optimization in order to reduce the consumption of fuel.

The present disclosure proposes a control method for improving power performance or fuel efficiency in response to a driver's request on a curved road, a ramp, and a sloping road, and intends to minimize or maximize the loss of energy inside an internal combustion engine cylinder in response to the driver's request using the control method.

In particular, a control method intends to reduce unnecessary acceleration and braking to produce an improvement of power performance or fuel efficiency by adjusting the speed of the vehicle as required by the driver and based on the form of a driving path, in order to improve stability and the driver's convenience compared to the currently applied adaptive cruise control technology.

A method for controlling an engine in various operating modes according to one exemplary form of the present disclosure includes, with regard to an engine having dual injectors, an injector selection step S100 of selecting a number of injectors with which to inject fuel based on an operating mode of the various operating modes, and a fuel injection step S300 of injecting the fuel based on a selection of whether to inject the fuel while an intake valve is open, or to inject the fuel while the intake valve is closed.

Although various operating modes may be set based on the design or the environment, in the present disclosure, the operating modes may be divided into a general mode M1, a first mode M2 aimed at fuel efficiency improvement, and a second mode M3 aimed at performance increase. For convenience of description, the modes will be named and described the general mode M1, the fuel efficiency mode M2, and the sports mode M3. In addition, an operating mode selection step S500 of selecting the operating mode based on the user's selection may be performed before the injector selection step S100.

When the user selects the general mode M1, a controller is configured to adjust the injection ratio, injection amount, and injection timing of injectors in a previously input way, thereby adjusting the amount of fuel to be introduced into a combustion chamber. More specifically, the controller is configured to adjust the injection of fuel through a main injector and an auxiliary injector which are applied to a single cylinder. As the symmetric or asymmetric flow-rate, the injection ratio, injection amount, and injection timing of the main injector and the auxiliary injector are adjusted based on the road condition and the driving conditions, the injection of fuel is implemented so that power performance and fuel efficiency are appropriately adjusted based on the driving conditions.

When the fuel efficiency mode M2 is selected, a user has selected fuel efficiency and saving fuel, over power performance of the vehicle. Therefore, in the injector selection step S100, a control operation is performed to inject fuel using only a single injector from a single cylinder. In addition, in the fuel injection step S300, when the fuel efficiency mode M2 is selected, a control operation is performed to inject fuel either while the intake valve is open or while the intake valve is closed, as is occasionally demanded while the vehicle is being driven, and which may reduce the amount of fuel to be injected into the combustion chamber, resulting in an improvement of fuel efficiency in the range from 5% to 10%.

When the user selects the sports mode M3, in the injection selection step S100, both the main injector and the auxiliary injector applied to a single cylinder are controlled to inject fuel. In addition, the fuel is injected while the intake valve is open in order to increase the power performance of the engine, and the amount of fuel is increased and the required torque is increased, which has the effect of increasing performance in the range from 2% to 4%.

Figure 2:
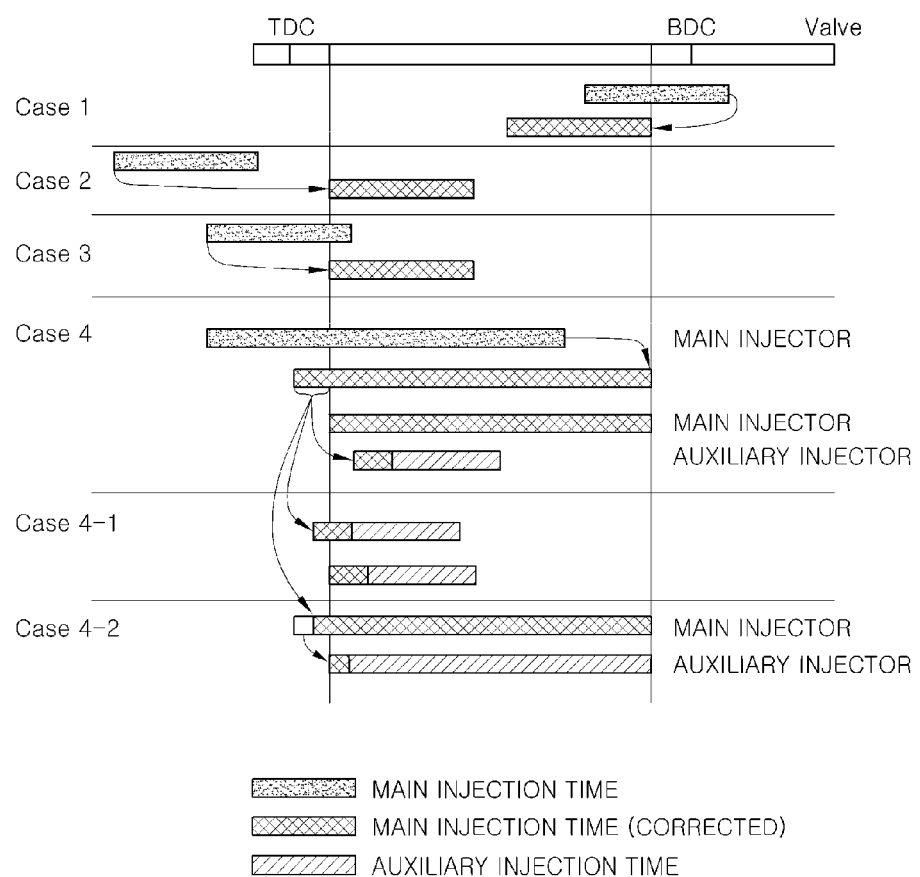
FIG. 2 is a view illustrating a correction of fuel injection timing in various cases.

In FIG. 2, in the fuel injection step S300, effective injection periods of the main injector and the auxiliary injector are adjusted to enable the injection of fuel during a prescribed set interval between BDC and TDC. As such, the main injector and the auxiliary injector are equally controlled to ensure that the injection of fuel occurs during the entire period between BDC and TDC. A method for controlling the main injector and the auxiliary injector will be described below with reference to FIG. 2.

Case 1 through Case 3 are cases where only the main injector injects fuel. In Case 1, the effective injection period is set to extend from before BDC to after BDC, and the injector is controlled such that the effective injection period is shifted into the set interval. In Case 2, the effective injection period is set to after TDC, and the injector is controlled such that the effective injection period is shifted into the set interval. In Case 3, the effective injection period is set to extend from before TDC to after TDC, and the injector is controlled such that the effective injection period is shifted into the set interval.

Case 4 is a case where the effective injection period of the main injector is set to extend from a time after BDC to a time after TDC. In this case, since the effective injection period is set to be longer than the set interval, both the main injector and the auxiliary injector are controlled to inject fuel such that the effective injection period is shifted into the set interval. In this way, the controller is configured control the injectors to provide the corrected effective injection periods.

In Case 4, first, the effective injection period of the main injector is corrected by being shifted into the set interval. Here, note that the effective injection period of the main injector is longer than the set interval and that there is an additional effective injection period of the main injector that falls outside of the set interval. The auxiliary injector is then controlled to inject fuel simultaneously with the main injector, starting from the later portion of the injection period of the main injector and during the additional effective injection period. In Case 4-1, the auxiliary injector is controlled to inject fuel from the latter half of the set interval and the main injector is controlled to inject fuel after the injection of fuel through the auxiliary injector. In the fuel injection step S300 in Case 4-2, the main injector is controlled to inject fuel during the entire set interval. Here, note that the effective injection period of the main injector is longer than the set interval and that there is an additional effective injection period of the main injector that falls outside of the set interval. Thus, the auxiliary injector is controlled to inject fuel during a period calculated by subtracting the additional effective injection period of the main injector from the set interval. In this case, the main injector is controlled to additionally inject fuel during the subtracted period.

As described above, in an exemplary form of the present disclosure, an effective injection period of fuel is corrected to conform to each case, and the injector is controlled to inject fuel during the corrected effective injection period, so vehicle driving may be implemented to conform to a desired mode of the user, such as, for example, a mode aimed at fuel efficiency improvement or a mode aimed at performance increase. Of course, setting of an effective injection period may be changed according to the environment of the vehicle or other set conditions, and is not particularly limited to the above description.

Figure 3:
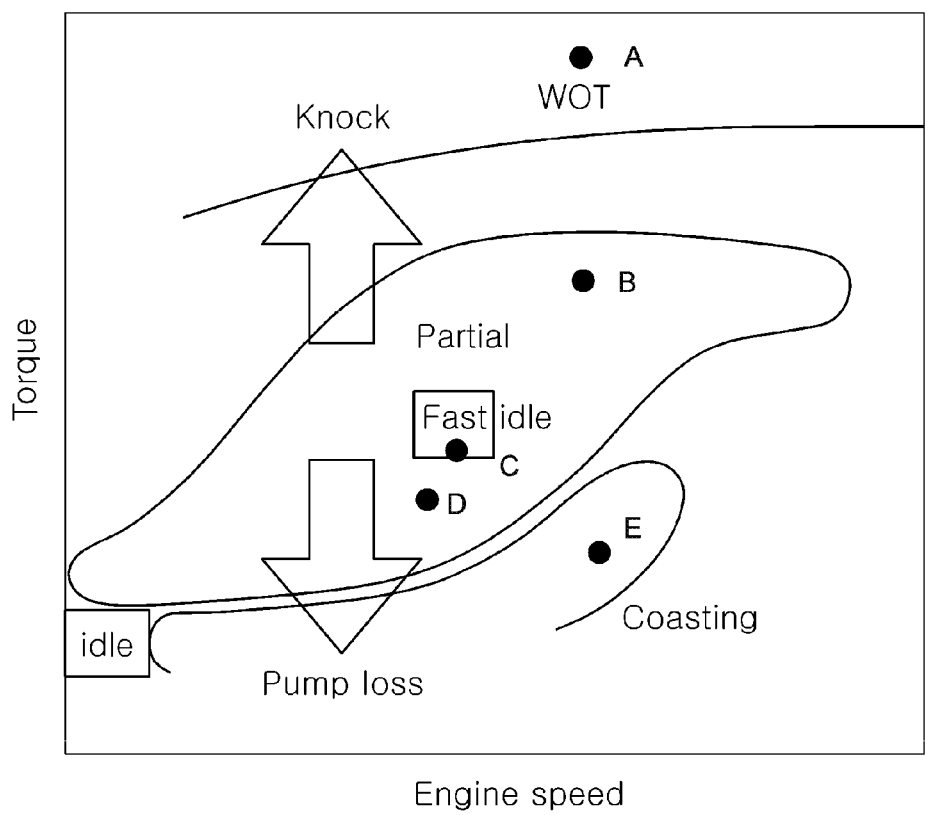
FIG. 3 is a graph illustrating a relationship between speed and torque of an engine.

FIG. 3 is a graph illustrating a relationship between speed and torque of an engine. Point A corresponds to an open state of a throttle valve. In this state, it is important to increase suction efficiency inside a cylinder and to increase combustion efficiency for anti-knocking. Thus, fuel is injected, under the spray optimization condition, while the valve is open, in order to increase the cooling effects of suctioned air, to reduce the wall wetting phenomenon, and to increase vaporization ability. In addition, it is important to increase combustion efficiency for anti-knocking. To this end, spray atomization, independent injection, and multi-injection are performed in order to increase the homogeneity of fuel, to increase vaporization ability, and to facilitate the diffusion of fuel.

Point B has a lower load compared to point A, but still exhibits high load. Therefore, as with point A, it is important to increase combustion efficiency for anti-knocking. To this end, spray atomization, independent injection, and multi-injection are performed in order to increase the homogeneity of fuel, to increase vaporization ability, and to facilitate the diffusion of fuel.

Points C, D and E have a lower load compared to points A and B, and correspond to an idle or fast-idle state. In such a state, it is necessary to prevent pump loss. Hence, points C, D and E may correspond to low load, coasting, warm-up, and fast-idle states, and it is important to increase combustion stability via a high exhaust gas recirculation (EGR) rate and fast catalyst warm-up. Thus, it is important to reduce the wall wetting phenomenon. To this end, the valve is open to inject fuel in the spray optimization condition, and independent injection and multi-injection are performed using a swirl control valve in order to effectively promote swirl in the combustion chamber. In addition, in order to increase combustion efficiency, the homogeneity of fuel is increased to reduce the wall wetting phenomenon and to increase the diffusion of fuel. That is, the valve is open as described above and fuel is injected in the spray optimization state in order to reduce the wall wetting phenomenon, and the swirl control valve is used to perform independent injection and multi-injection in order to effectively promote swirl in the combustion chamber. In addition, the implementation of independent injection and multi-injection using the swirl control valve to effectively promote swirl in the combustion chamber may increase the diffusion of fuel.

Considering a hydrocarbon (HC) discharge interval during cooling, generally, the discharge of HC initially increases within 5 seconds after the ignition is turned on. At this time, the main purpose is to reduce the amount of HC discharged from the engine and to reduce the amount of non-combusted HC and, thus, to inject atomized fuel.

When a catalyst is warmed up after the ignition is turned on, fuel is injected, in the spray optimization condition, while the valve is open, in order to reduce the amount of HC discharged from the catalyst and to expand a delay limit. At this time, independent injection and the swirl control valve may be used as options. In addition, like in the state immediately after the ignition is turned on, optionally, fuel may be atomized and multi-injection may be performed, in order to reduce the amount of HC discharged from the engine and the amount of non-combusted HC.

Thereafter, when the engine is warmed up, fuel is injected in the spray optimization condition while the valve is open, in order to reduce the amount of HC discharged from the catalyst and to facilitate the control of fuel efficiency. At this time, multi-injection may be performed as an option. In addition, optionally, fuel may be atomized and multi-injection may be performed, in order to reduce the amount of HC discharged from the engine and the amount of non-combusted HC.

Here, considering injection in the open state and the closed state of the valve, injecting fuel while the valve is closed causes the wall wetting phenomenon, and in some cases causes the fuel to be introduced, in an agglomerated state, into the combustion chamber, which results in incomplete combustion due to the inhomogeneous fuel. However, injecting fuel while the valve is open reduces the wall wetting phenomenon, thereby preventing fuel from being introduced, in the agglomerated state, into the combustion chamber, and thereby reducing incomplete combustion.

In a high-load state, i.e. in a state in which knocking occurs, fuel is injected while the valve is open, so as to reduce the wall wetting phenomenon of the port and to implement cooling using suctioned air, which, by increasing combustion stability, has the effect of reducing the occurrence of knocking.

In a low-load state, i.e. a Minimum spark advance for Best Torque (MBT) state, likewise, fuel is injected while the valve is open, so as to achieve a high EGR rate through increased combustion stability, and to increase combustion efficiency through the use of homogeneous fuel.

In a method for controlling the engine in various operating modes according to the present disclosure, first, in the injector selection step S100, a number of injectors is selected based on a relationship between speed and load of an engine, to determine whether to perform multi-injection or single injection. Then, in the fuel injection step S300, the injection of fuel is implemented based on the selection of whether to inject fuel while the intake valve is open or to inject fuel while the intake valve is closed. A controller is configured to control the injectors to improve volumetric efficiency and to increase the response speed in a low-speed and high-load region, and also to control the injectors to improve volumetric efficiency in a high-speed and high-load region. In addition, the controller is configured to control the injectors to improve fuel efficiency and to reduce HC in a middle-load region, to control the injectors to improve fuel efficiency and starting characteristics in a low-speed and low-load region, and to control the injectors to increase combustion stability while idling.

Figure 4:
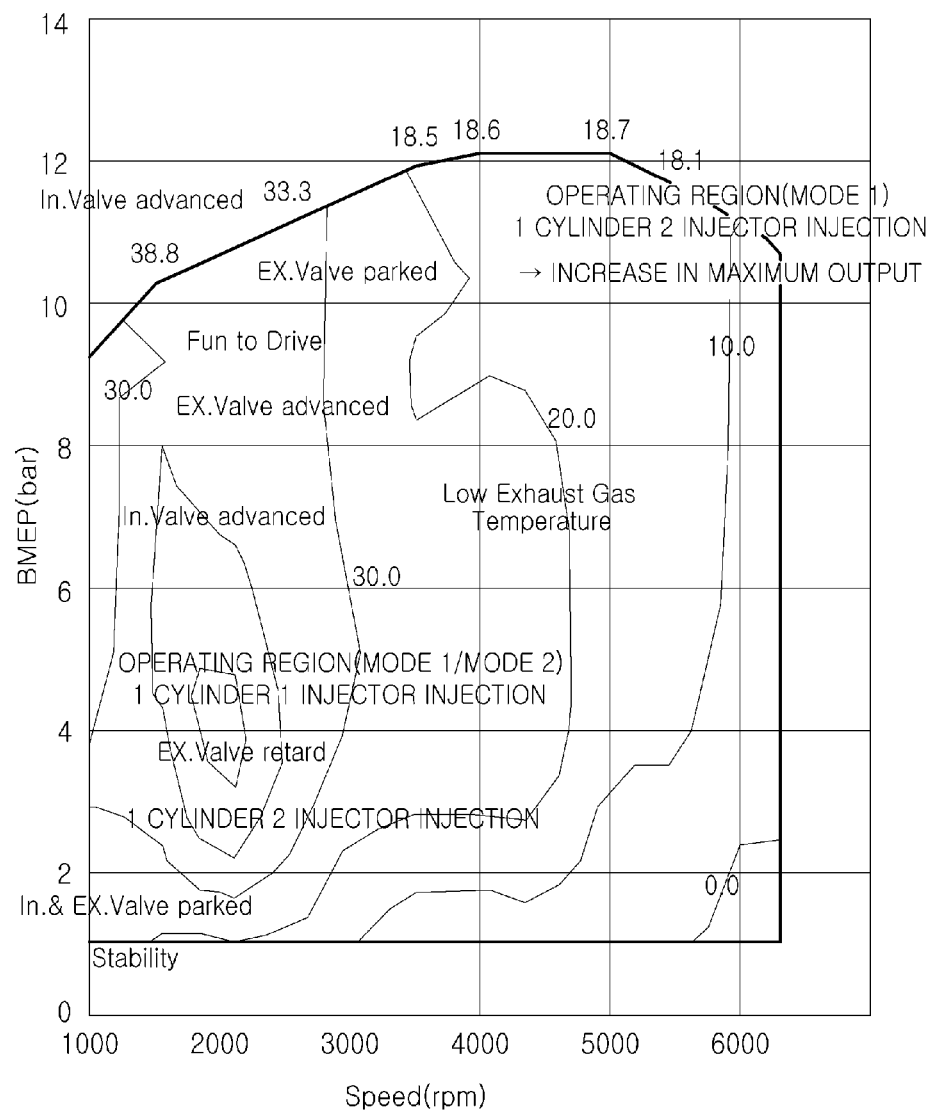
FIG. 4 is a graph illustrating a relationship between speed and load of an engine.

FIG. 4 is a graph illustrating a relationship between speed and load of an engine. As described above, the injectors are controlled to minimize total hydrocarbon (THC) and to achieve combustion stabilization and negative suction pressure while idling. In addition, in a main operating region of a Federal Test Procedure 75 (FTP-75), which is a city mode for measurement of fuel efficiency, the injectors are controlled to adjust the amount of fuel so as to be operated in the general mode M1, the fuel efficiency mode M2, and the sports mode M3. That is, the controller is configured to control the number, injection ratio, injection amount, and injection timing of the injectors based on the user's selection in the injector selection step S100 and the fuel injection step S300.

A continuous variable valve timing (CVVT) system may be applied. In this case, two injectors are used for a single combustion chamber in order to maximize full-load timing and the amount of fuel in middle-load and high-load regions. In this case, the injectors may be used to the maximum extent and fuel may be injected while the valve is open. In addition, in a full-load region, an injection strategy focused on power performance, similar to that in the middle-load and high-load regions, may be used. Fun-to-drive control is performed in middle-speed and high-speed regions.

As is apparent from the above description, a method for controlling an engine in various operating modes according to the present disclosure has advantages of: increasing the uniformity of mixed air, via fuel atomization; eliminating the wall wetting phenomenon of a port or an intake valve, due to reduced fuel invasion; and alleviating knocking characteristics, by air cooling as fuel is injected while the valve is open. In addition, ignition time advance caused by improved knocking characteristics under the full-load performance condition has the effect of improving engine torque in the range from 1% to 3% depending on RPM, and fuel injection while the valve is open under the partial load condition has the effect of improving fuel efficiency by 0.33% via ignition time advance.

Although exemplary forms of the present disclosure have been disclosed for illustrative purposes, those skilled in the art will appreciate that various modifications, additions and substitutions are possible, without departing from the scope and spirit of the disclosure as described in the accompanying claims.

What is claimed is:

1. A method for controlling an engine having dual injectors and various operating modes, wherein the operating modes are divided into a general mode, a first mode aimed at fuel efficiency improvement, and a second mode aimed at performance increase, the method comprising:
   a step of selecting a number of injectors configured for injecting fuel based on an operating mode of the various operating modes; and
   a step of injecting fuel based on a selection of whether to inject fuel while an intake valve is open, or to inject fuel while the intake valve is closed.

2. The method of claim 1, wherein, in the general mode, a controller is configured to control adjustment of the amount of fuel to be introduced into a combustion chamber by adjusting an injection ratio, injection amount, and injection timing of the injectors in a previously input way.

3. The method of claim 1, wherein only one injector performs injection in the first mode.

4. The method of claim 1, wherein both of the injectors perform injection in the second mode.

5. The method of claim 1, wherein the step of injecting fuel includes adjusting injection timings of a main injector and an auxiliary injector such that fuel is injected within a prescribed set interval between bottom dead center (BDC) and top dead center (TDC).

6. The method of claim 5, wherein the step of injecting fuel includes controlling the main injector such that, when an effective injection period of the main injector is set to extend from before BDC to after BDC, the effective injection period is shifted into the set interval.

7. The method of claim 5, wherein the step of injecting fuel includes controlling the main injector such that, when an effective injection period of the main injector is set to occur after TDC, the effective injection period is shifted into the set interval.

8. The method of claim 5, wherein the step of injecting fuel includes controlling the main injector such that, when an effective injection period of the main injector is set to extend from before TDC to after TDC, the effective injection period is shifted into the set interval.

9. The method of claim 5, wherein the step of injecting fuel includes controlling the main injector and the auxiliary injector to inject fuel such that, when an effective injection period of the main injector is set to extend from a time after BDC to a time after TDC and is longer than the set interval, the effective injection period of the main injector is shifted into the set interval.

10. The method of claim 9, wherein the step of injecting fuel includes controlling the injectors such that the main injector injects fuel during the entire set interval, the auxiliary injector injects fuel simultaneously with the main injector starting from a later portion of the injection period of the main injector and during an additional effective injection period of the main injector that falls outside of the set interval.

11. The method of claim 9, wherein the step of injecting fuel includes controlling the injectors such that the auxiliary injector injects fuel from a latter half of the set interval and the main injector injects fuel after the injection of fuel through the auxiliary injector.

12. The method of claim 9, wherein the step of injecting fuel includes controlling the injectors such that the main injector injects fuel during the entire set interval, the auxiliary injector injects fuel during a period calculated by subtracting from the set interval an additional effective injection period of the main injector that falls outside of the set interval, and the main injector additionally injects fuel during the subtracted period.

13. An engine control unit configured to control an engine having dual injectors and various operating modes, wherein the operating modes are divided into a general mode, a first mode aimed at fuel efficiency improvement, and a second mode aimed at performance increase, the engine control unit comprising a controller configured to:
 select a number of injectors for injection of fuel, based on an operating mode of the various operating modes,
 select whether to inject fuel while an intake valve is open or to inject fuel while the intake valve is closed, based on the operating mode of the various operating modes, and
 control the injection of fuel, based on the selection of whether to inject fuel while the intake valve is open or to inject fuel while the intake valve is closed.

* * * * *